Feb. 16, 1965          H. KÖPPEN          3,169,464
PHOTOGRAPHIC CAMERA DIAPHRAGM ADJUSTING DEVICE
Filed Dec. 4, 1961          7 Sheets-Sheet 3

INVENTOR:
Heinz Köppen,
by Singer, Stern & Carlberg
Attorneys.

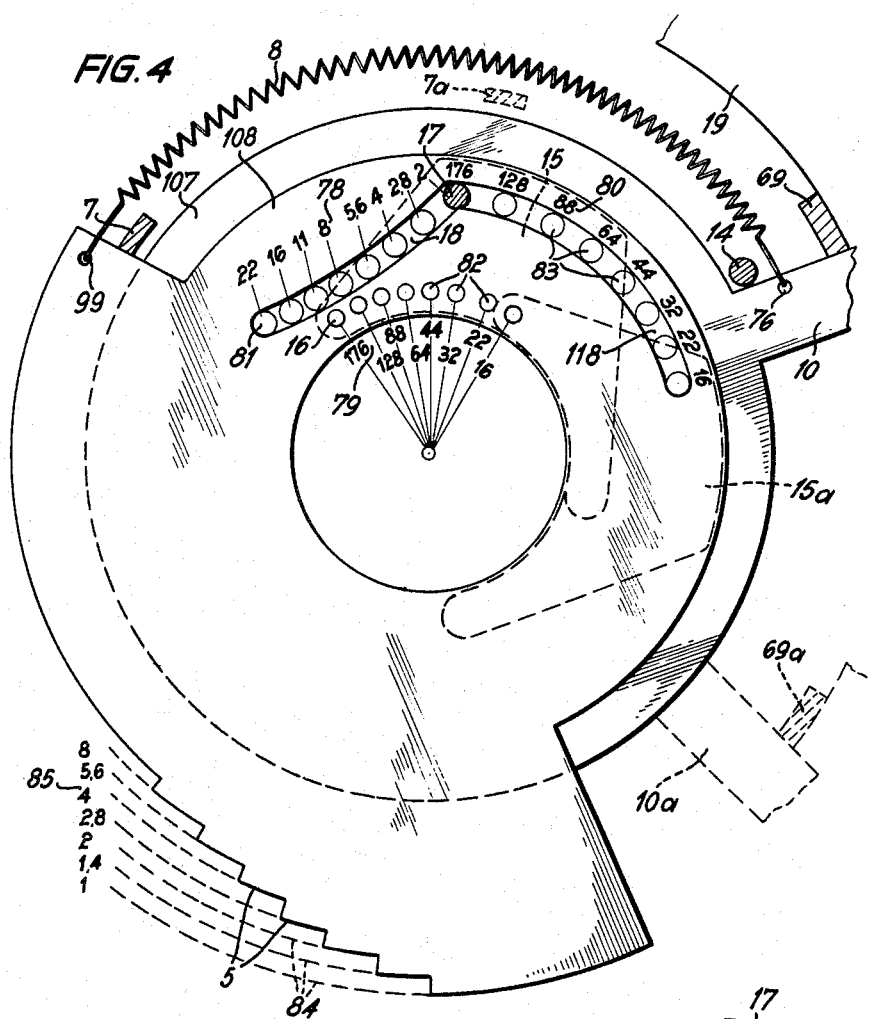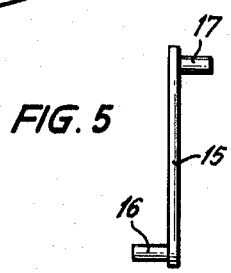

Feb. 16, 1965  H. KÖPPEN  3,169,464
PHOTOGRAPHIC CAMERA DIAPHRAGM ADJUSTING DEVICE
Filed Dec. 4, 1961  7 Sheets-Sheet 7

INVENTOR:
Heinz Köppen,
by Singer, Stern & Carlberg,
Attorneys.

United States Patent Office 3,169,464
Patented Feb. 16, 1965

3,169,464
PHOTOGRAPHIC CAMERA DIAPHRAGM
ADJUSTING DEVICE
Heinz Köppen, Stuttgart, Germany, assignor to Zeiss Ikon
Aktiengesellschaft, Stuttgart, Germany
Filed Dec. 4, 1961, Ser. No. 156,740
Claims priority, application Germany, Dec. 15, 1960,
Z 8,428
19 Claims. (Cl. 95—64)

The invention relates to photographic cameras and photographic objectives or shutter mechanism and is particularly concerned with photographic devices of the type which includes a so-called flash exposure mechanism. This flash exposure mechanism is constructed in such a manner that with or upon the adjustment of the camera or the camera objective to a selected flash guide number or a distance value by means of the associated elements provided for this purpose on the camera, the camera objective or the shutter mechanism, a diaphragm aperture will be formed automatically which fulfills the relations of Diaphragm Aperture=Flash Guide Number÷Distance Under the designation of "automatic formation of the diaphragm aperture" is to be understood not only the formation of the diaphragm aperture simultaneously with the selection of the guide number and distance value, but also the adjustment of a spring operated diaphragm mechanism upon actuation of the camera release element, and finally, there is to be understood the formation of the diaphragm aperture by means of a special manually operable member, for instance a push button.

It is an object of the invention to employ for the purpose of introducing into the diaphragm mechanism the two mentioned values, namely the guide number and the distance, a diaphragm mechanism which is provided with two rotatable diaphragm cages of which each one by its rotative movement effects an adjustment of the diaphragm segments. One of the two diaphragm cages is adjusted by a guide number adjusting element of the camera or of the objective or of the shutter, while the other diaphragm cage is adjusted upon the adjustment of the distance adjusting element of the camera. The control of these elements takes place in accordance with the specific features of the invention by means of control projections which are arranged on the adjustable members of the camera or on the objective or on the shutter, and which by means of intermediate elements, such as levers, toothed segments or the like, come into operative engagement with abutments which in turn act upon the rotatable diaphgram cages.

It is also an object of the invention to provide the camera with means which prevent the camera user from making incorrect exposures whereby these means automatically limit the distance adjusting range in dependence of the adjusted guide number. In addition, provisions have been made for disconnecting the automatic flash mechanism when it is desired to make daylight exposures with the camera. These provisions consist substantially of a change-over element, preferably an actuating ring, which carries scales, markers and the like, and is also provided with means which upon changing from the automatic flash range to the daylight range disconnect the automatic flash mechanism, but at the same time are effective for permitting a manual adjustment of the diaphragm aperture or a diaphragm preselection, respectively, and also permit a diaphragm formation on the basis of an automatic exposure mechanism.

These and other objects of the invention which will appear hereinafter will now be described with reference to the accompanying drawings which illustrate diagrammatically various embodiments and details of the invention and a complete view of a camera constructed in accordance with the invention.

In the drawings:

FIG. 4 illustrates an enlarged portion of FIG. 3;

FIG. 5 illustrates an end view of one of the diaphragm segments;

Figure 1:
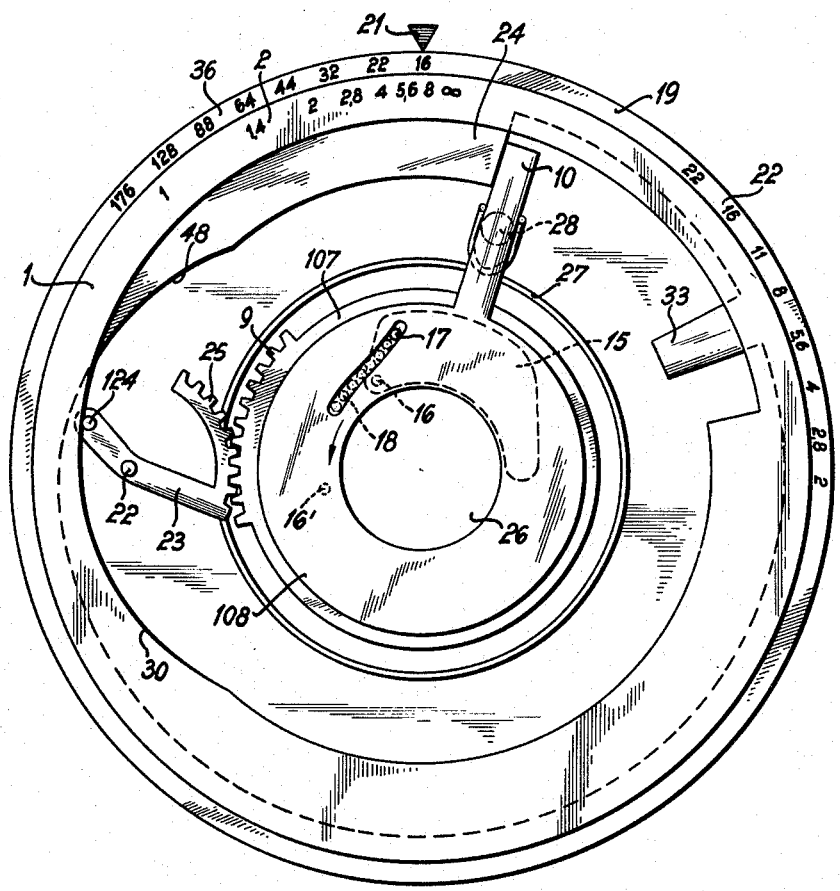
FIG. 1 illustrates diagrammatically a front elevation view of one embodiment of a camera objective provided with the exposure control devices of the invention.
Figure 8:
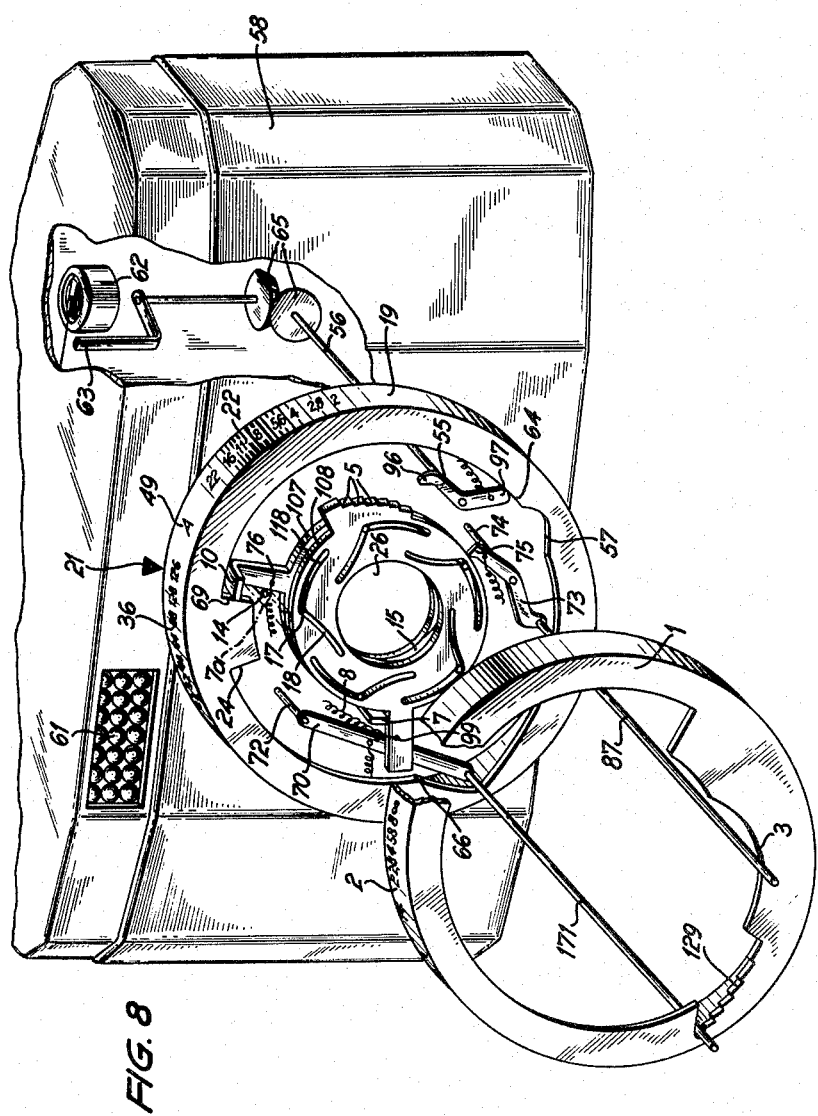
FIG. 8 is a perspective view of a camera with certain parts shown in an exploded view to clearly show the principal features of the invention as diagrammatically illustrated in FIG. 3.

Referring to FIG. 1, which illustrates diagrammatically a front elevation view of a camera objective, a guide number ring 19 surrounds concentrically the camera objective. This ring 19 also performs the function of a diaphragm adjusting ring when making daylight exposures in which case the diaphragm is manually adjusted to the desired aperture. In fact, this ring 19 is used for changing the camera selectively from a so-called flash exposure camera to a daylight exposure camera. Accordingly, the ring 19 which may also be called a "change-over ring" is provided on one portion of its circumference with a guide number scale 36 and another portion, which is circumferentially displaced from this guide number scale 36, is provided with a diaphragm aperture scale 22. Next to this guide number and diaphragm adjusting ring 19 is arranged a distance adjusting ring 1 provided with a distance scale 2. All these three scales 36, 22 and 2 are adjustable relative to a common stationary index mark 21 which preferably is arranged on the camera casing (FIG. 8).

The diaphragm is provided with a first rotatable diaphragm cage 107 and with a second rotatable diaphragm cage 108. For the sake of a better illustration in the drawing, these diaphragm cages 107 and 108 and also the rings 19 and 1 are shown as having different diameters, but of course this is not done in actual practice. The first rotatable diaphragm cage 107 is provided on a portion of its circumference with exterior gear teeth 9, while the diaphragm cage 108 is provided with a radially outwardly extending arm 10.

The diaphragm is provided with a plurality of adjustable diaphragm segments of whicht only one segment 15 is illustrated and the latter, as shown, is connected with the first diaphragm cage 107 by a pin 16 and with the second diaphragm cage 108 by a pin 17 (FIG. 5). The pin 16 is supported in a bore of the diaphragm cage 107 and therefore this pin 16 constitutes the stationary axis of rotation of the diaphragm segment 15. The pin 17, however, extends into a curved slot 18 of the diaphragm cage 108 and is movable therein. The particular position of the pin 17 in this curved slot 18 determines the position of the diaphragm segment 15.

The guide number and diaphragm adjusting ring 19 is provided with an inwardly projecting control projection 24 which is engaged by the radial arm 10 on the second diaphragm cage 108 and adjusts the latter when the ring 19 is adjusted to higher guide numbers.

The adjustment of the cage 108 takes place in a direction in which the diaphragm aperture is reduced. Both sides of the radial arm 10 are engaged by outwardly bent ends of a circular omega spring 27 which extends concentrically about the optical axis of the camera objective. When this spring 27 is not spread apart, both ends of the same engage opposite sides of a stationary pin 28. The outwardly bent ends of the spring 27 permit a rotation of the first diaphragm cage 107 in both directions, but the latter will always return to the rest position as shown in the drawing.

The distance adjusting ring 1 is provided on its inner circumference with a control cam 30 which is engaged by a tracking pin 124 on an angle lever 23 whose apex is rotatably supported on a stationary axis 22. This angle lever 23 is urged by a non-illustrated spring in such a direction that the pin 124 thereon is maintained in engagement with the cam 30. The other free end of the angle lever 23 is provided with a gear segment 25 which is in engagement with the gear teeth 9 on the outer circumeference of the first rotatable diaphragm cage 107. The control cam 30 serves for the purpose of adjusting the angle lever 23 in accordance with the distance to which the ring 1 has been adjusted so that the diaphragm aperture will correspond to the selected distance adjustment. FIG. 1 illustrates for instance that, when the ring 1 has been adjusted to a distance of 8 meters which for all practical purposes is the greatest distance suitable for making flash exposures, the diaphragm will be fully opened. If, however, the ring 1 is adjusted to a shorter distance, then the pin 124 of the angle lever 23 moves into the range of a stronger curved portion of the cam 30 so that the gear segment 25 moves downwardly which has the result that the first diaphragm cage 107 is rotatably adjusted counterclockwise. Hereby the pivot pin 16 is moved into a lower position as indicated by the arrow in FIG. 1 and this results in a movement of the diaphragm segment 15 into the light passage aperture 26 of the camera objective so that the effective light passage aperture formed by the segments 15 is reduced to a size smaller than the aperture 26.

In order to adjust the diaphragm aperture not only with reference to the adjusted distance, but also with reference to a desired guide number value, it is necessary to adjust the ring 19 which for this purpose is provided on its inner circumference with said control projection 24. As already stated, this control projection 24 engages one side of the radial arm 10 of the second diaphragm cage 108 and effects a rotation of this diaphragm cage 108 in clockwise direction when the ring 19 is adjusted clockwise to higher guide numbers. This rotative movement effects a movement of the pin 17 and a gradual closing of the diaphragm segment 15.

The operation of the flash exposure mechanism is therefore such that upon adjustment to different guide numbers and distance values the diaphragm aperture will be automatically adjusted to these adjusted values. When the camera or the camera objective is adjusted to smaller distances, the diaphragm by means of the cam 30 on the distance adjusting ring 1 effects a pivotal movement of the angle lever 23 and an operation of the gearing 25, 9 so that the diaphragm aperture is reduced. This adjustment of the diaphragm aperture by means of the distance adjusting ring 1 takes place by means of the first rotatabl diaphragm cage 107 and a corresponding displacement of the pin 16.

The adjustment of the diaphragm in accordance with the adjusted guide number value takes place by means of the ring 19 and its control projection 24 thereon, because this control projection 24 operates the radial arm 10 on the second diaphragm cage 108. An adjustment of the ring 19 to higher guide numbers effects a clockwise rotation of the second diaphragm cage 108 and since now the pin 17 moves along the curved slot 18, the diaphragm aperture is reduced in size.

The control cam 30 on the distance adjusting ring 1 has not only the property of an actuating cam, but performs also the function of a compensating cam in that the nonlinear distances between the gradation lines of the distance scale 2 are transformed into linear adjusting distances of the diaphragm mechanism.

For the purpose of operating the camera or the camera objective as an ordinary device, namely for making daylight exposures, and in order to adjust the diaphragm manually, the invention provides the following arrangements.

The ring 19, as already stated in the foregoing, is provided in addition to the guide number scale 36 with a conventional diaphragm aperture scale 22. When the camera or the camera objective is to be changed from flash exposure operation to daylight exposures, the desired diaphragm aperture value on the scale 22 has to be brought opposite the stationary index 21 on the camera and for this purpose the ring 19 is manually rotated. The ring 19 is provided on its inner circumference with a disconnecting cam 48 which has the effect that during this change the angle lever 23 is pivoted about its axis of rotation and is moved into such a position that this lever 23 no longer prevents the manual adjustment of the diaphragm. In addition, the ring 19 is provided on its inner circumference with a second radially inwardly extending projection 33 which is adapted to engage the radial arm 10 of the second diaphragm cage 108 and which causes the adjustment of the diaphragm to the value adjusted by the ring 19.

The disconnecting cam 48, which becomes operative when the camera user rotates the ring 19 into a position in which the diaphragm aperture may be manually adjusted, causes the angle lever 23 to be moved into an extreme position which effects the corresponding rotative adjustment of the first diaphragm cage 107. When this happens, the axis of rotation 16 of the diaphragm segment 15 moves into the position indicated with 16' and this has the result that the diaphragm segment 15 is moved into a position in which the diaphragm will have the smallest aperture, namely to the value which appears on the scale 22 as $f{:}22$. At the same time, the pin 17 of the diaphragm segment 15 wil be moved to its lowest position in the slot 18. If now a manual adjustment to a larger diaphragm aperture takes place, the projection 33 moves the radial arm 10 of the second diaphragm cage 108 in counterclockwise direction and this has the effect that the pin 17 moves gradually upwardly in the guide slot 18 and the diaphragm is gradually opened again.

Figure 2:
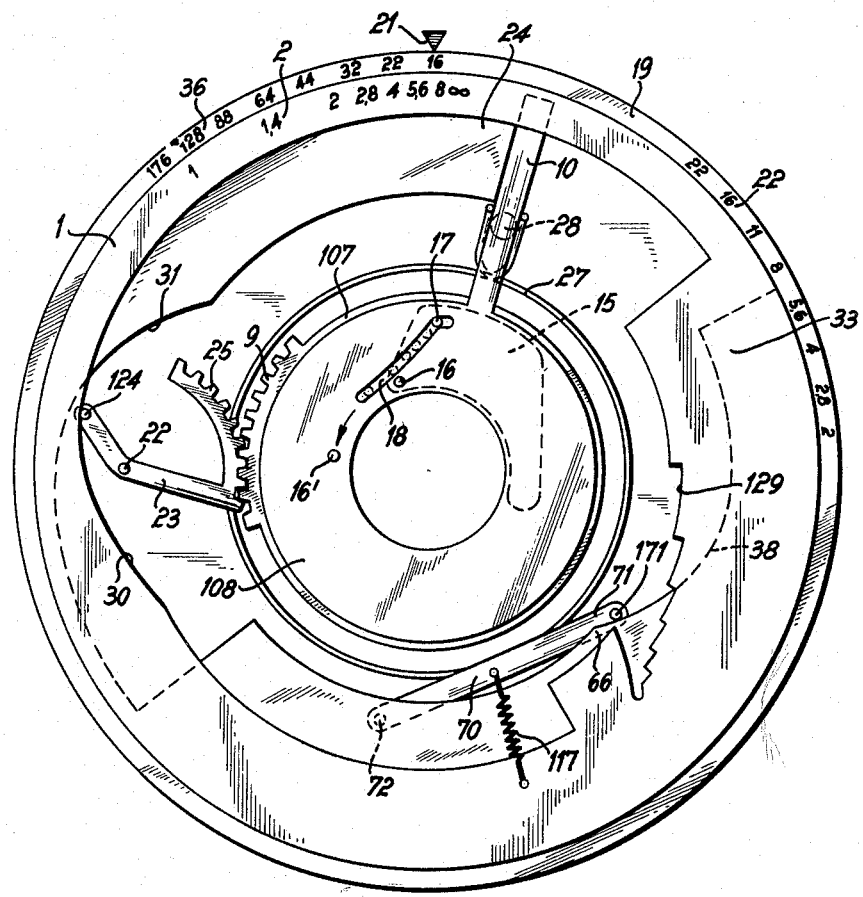
FIG. 2 illustrates in a similar view another embodiment of the invention.

In the embodiment illustrated in FIG. 2, there are employed in addition to the features of FIG. 1 several other elements which limit the distance adjusting range in dependence of the adjusted guide number and, furthermore, means are provided for rendering these elements, which automatically limit the distance range, ineffective when the ring 19 is rotated from the range of the flash exposure mechanism to the mechanism which permits a manual selection of the diaphragm or a preselection of the diaphragm.

According to FIG. 2, the guide number and diaphragm adjusting ring 19 is provided on its inner circumference with a control cam 38 which controls the pivotal movement of a lever arm 70, one end of which is rotatably supported about a stationary axis 72. A spring 117 is attached to the lever arm 70 at its approximate center and urges the lever 70 continuously into a position in which the free end 71 of the lever arm 70 engages the cam 38. The free end 71 of the lever arm 70 carries also a laterally outwardly projecting pin 171 which constitutes the so-called catch member of this lever arm 70.

The distance adjusting ring 1 is provided on its inner circumference with a ratchet cam 129, the individual steps of which have a width corresponding to the intervals of the scale 2 on the ring 1, while the height of the steps increases with the decreasing values of the distance scale. The catch member 171 of the lever arm 70 is intended to come into abutment with the individual radially directed abutment faces of the ratchet cam 129 in order that in dependence of the guide number adjustment there is obtained an automatic limitation of the exposure range which will be available to the camera user. The control cam 38 on the ring 19 is arranged and constructed in such a manner that it gives the lever arm 70 and its catch member 171 thereon a small angle of incidence with respect to the ratchet cam 129 when the ring 19 has been adjusted to a low guide number, while the lever arm 70 assumes a gradually greater angle of incidence relative to the ratchet cam 129 the higher the adjusted guide number on the guide number scale 36 is selected. In this manner the result is obtained that when a low guide number is selected, for instance the guide number 16, the entire distance range from 8 meters to 1 meter is available for taking flash pictures because for this range the diaphragm may be adjusted from $f:2$ to $f:16$. It is believed to be clear from the foregoing that when a higher guide number is selected, for instance the guide number 176 of the scale 36, the angle of incidence of the lever 70 and therewith that of the catch member 171 with respect to the ratchet cam 129 has become so great that only a distance of 8 m. for taking a flash picture will be available, while all other smaller distances are automatically blocked. When the adjusted guide number is 176 and the distance adjustment is 8 m., then there will always be available the diaphragm aperture $f:22$, but no shorter distance can be adjusted because there is no smaller diaphragm aperture available.

The automatic limitation of the exposure range in dependence of the adjusted guide number therefore takes places in this manner that the control cam 38 on the ring 19 raises and lowers the lever arm 70 which is in engagement with this cam 38 and the latter has such a control surface that the catch member 171 of the lever arm 70 upon an adjustment of the camera to a low guide number will assume a high position and that the lever arm 70 will assume a small angle of incidence with respect to the ratchet cam 129, while when the camera has been adjusted to any one of the higher guide numbers the lever arm 70 will assume a low position and will have a great angle of incidence with respect to the ratchet cam 129. When employing low guide numbers, the camera user has at his disposal almost the entire flash distance range before the catch member 171 will engage a step on the ratchet cam 129. When, however, the camera has been adjusted to a high guide number, then the catch member 171 will engage one of the first and lowest steps of the ratchet cam 129 and this means that the exposure range has been limited to a small distance range.

In order to render the automatic distance limiting arrangement ineffective when the camera or the camera objective is changed from flash exposures to daylight exposures and to make a manual adjustment of the diaphragm, the ring 19 is provided on its inner circumference with a disconnecting cam 66 which upon adjustment of the ring 19 to any value of the diaphragm scale 22 causes a movement of the lever arm 70 and the catch member 171 thereon into a position outside of the range of the ratchet cam 129. The catch member 171 on the lever arm 70 will be engaged by this disconnecting cam 66 and is raised by the latter to a position beyond the highest point of the uppermost step of the ratchet cam 129. A limitation of the adjustable distance range does then no longer take place because the free end 71 of the lever 70 and the catch member 171 thereon has come into engagement with the disconnecting cam 66 and has been moved into a position in which no part of the lever 70 is able to engage the ratchet cam 129. The camera therefore may be operated as a conventional daylight exposure camera and the photographer can freely select any desired diaphragm aperture and any desired distance and this is possible as soon as the diaphragm scale 22 has been moved opposite the stationary index 21.

Figure 3:
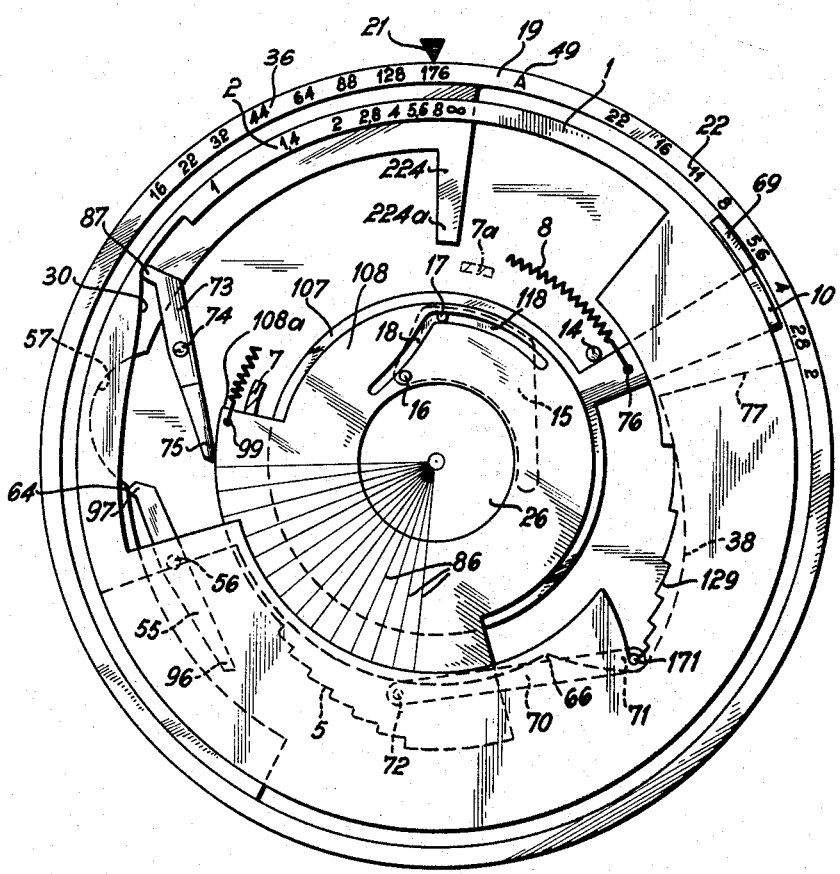
FIG. 3 illustrates a more elaborated embodiment of the invention in a view similar to FIG. 1.

The FIGS. 3 to 5 illustrate another modification of the camera objective in which all the parts which are also used in the FIGS. 1 and 2 have been given the same reference numeral. The embodiment of FIG. 3 differs however from the previously described two embodiments in this, that no pivoted lever with a gear segment is used for the introduction of the distance adjustment into the diaphragm mechanism, but in place of such a gear segment there is only used a lever 73 which is actuated by the cam 30 on the distance adjusting ring 1. This lever 73 is pivotally mounted between its ends about a stationary axis 74 and its lower end 75 forms a catch member which cooperates with a series of abutment steps 5 on the outer circumference of the rotatable diaphragm cage 108. The upper end 87 of this lever 73 is in constant engagement with the cam 30 on the distance adjusting ring 1 and is maintained in this position by a not illustrated spring. Depending upon the extent of the movement of the lever 73, when it is actuated by the cam 30, the lower end 75 performs a predetermined movement depending upon the distance to which the ring 1 has been adjusted and this movement of the lever end 75 has the result that depending upon the angle of incidence of the lever 73 its lower end 75 will come sooner or later into engagement with one of the steps on the series of abutment steps 5. The lever 73 will be moved by the cam 30 in such a manner that when the greatest distance for flash exposures, namely a distance of 8 m., has been selected, the lever 73 has reached its greatest angle of incidence and is closest to the lowest step of the series of steps 5, while upon adjustment of the camera to shorter distance values the lever 73 will assume a smaller angle of incidence and is raised step by step with respect to the series of abutment steps 5.

In the same manner as illustrated in connection with the embodiment of FIG. 2 there is provided an abutment member for limiting the distance adjustment in dependence of the adjusted guide number, namely the distance limiting lever 70 which cooperates with a control cam 38 on the ring 19. This lever in the same manner as shown in FIG. 2 is pivotally mounted about a stationary axis 72 and its free end 71 is urged by a not illustrated spring into engagement with the cam 38. This free end 71 of the lever 70 is also provided with an outwardly projecting pin 171 which constitutes a catch member for the ratchet cam 129 on the distance adjusting ring 1. As illustrated in FIG. 3, the end 71 of the lever 70 is caused to move about its axis 72 by the cam 38 in dependence of the adjusted guide number and is able to assume various angles of incidence with respect to the ratchet cam 129 which has the result that when the ring 19 has been adjusted to higher guide numbers, the catch member 171 engages steps which correspond to predetermined distances so that the other distances will be blocked, while on the other hand upon adjustment to low guide numbers the catch member 171 will engage only the last one of the steps which corresponds to a close distance range so that in the limited condition the entire distance range of 8 m. down to 1 m. will be available. A catch member 171 which projects laterally from the plane of the lever 70 is required because the adjusting rings 1 and 19 are arranged in different planes. In the illustrated embodiment of the invention the ring 19 is arranged directly below the distance adjusting ring 1.

The embodiment of the invention illustrated in FIG. 3 is insofar different from and further developed than the one shown in FIG. 2 as there is employed another catch member 55, 96 for an automatic exposure mechanism. This catch member consists essentially of a two armed lever 55 which is fixedly mounted approximately in its center on a horizontally extending shaft 56. This shaft 56 is rotated when the automatic exposure mechanism of the camera is operative. The rotative movements of the shaft 56 are transferred to it by a tracking member 63 which in turn receives its movements from the exposure meter built into the camera casing and, more specifically stated, from the movable pointer of the measuring instrument of the exposure meter (see FIG. 8). The lower end 96 of the lever 55 is adapted to be brought into engagement with one of the steps of the series of abutment steps 5. This series of abutment steps 5 may in known manner consist of a common abutment cam for an exposure control mechanism which runs off when the camera or rather its tensioned shutter mechanism is released in order to make an exposure, whereby at the same time the diaphragm mechanism and the distance range mechanism is included in this arrangement. The end 97 of the lever 55 is urged in constant engagement with a cam 64 on the ring 19 by a not illustrated spring. This cam 64 is so constructed that upon operation of the flash exposure range the lever 55 is rendered inoperative as far as the series of abutment steps 5 is concerned, while upon operation of the automatic exposure mechanism the lever 55 is made freely movable so that it may follow the control movements of the tracking member 63 operated by the exposure meter. This free movability of the lever 55 upon operation of the automatic exposure mechanism of the camera is effected in that the upper end 97 of the lever 55 is brought out of engagement with the cam 64 acting as a disconnecting element and slides from the end of the cam 64 into a deep recess 57 in this cam 64. The size of this recess 57 is such that even the greatest movements of the lever 55 are not obstructed.

For the purpose of introducing the adjusted distance values and guide number values into the diaphragm mechanism for adjusting the diaphragm aperture to the required size, there is provided in the modification of the invention as illustrated in FIG. 3 an arrangement in which two rotatable diaphragm cages are employed. The diaphragm cage 108 carries the series of abutment steps 5 on a portion of its outer circumference and these abutment steps are used as described previously for the formation of the diaphragm aperture in dependence of the distance adjustment by means of the lever 73 and its lower pointed end 75. The introduction of the guide number values is accomplished by the second rotatable diaphragm cage 107 and is performed in such a manner that the diaphragm cage 107 is provided with a radial arm 10 which cooperates with an inwardly extending projection 69 on the inner circumference of the ring 19. This arm 10 is stopped against movement in one direction by a stationary pin 14 or the like and this means that the diaphragm cage 107 from the position shown in the drawing may only be rotatably adjusted in clockwise direction. The diaphragm cage 108 can be moved by a concentrically movable operating member 7 and when the camera has been tensioned into the end position corresponding to the largest diaphragm aperture, it will be held in this position until the camera is released. This operating member 7 is controlled by the customary film advancing and shutter tensioning mechanism of the camera. When the camera is released, the operating member moves from the position 7 shown in FIG. 3 in full lines into the position 7a indicated in dash-dotted lines, whereby a release of the diaphragm cage 108 takes place so that it may rotate in clockwise direction. This known movement is assisted or even performed by a spring 8 which is attached with one of its ends to the point 99 on the diaphragm cage 108 and with its other end to the point 76 on the diaphragm cage 107 or, more specifically, the point 76 will be found on the radial arm 10. In the illustrated position the two diaphragm cages 107 and 108 are rotatably positioned in such a manner that the spring 8 has been tensioned to its maximum extent. The spring 8, therefore, has tensioned the rotating diaphragm cage 108 with respect to the diaphragm cage 107 in clockwise direction. For the sake of a better reading of the drawing, the diaphragm cages 107 and 108 are shown as having different diameters.

The diaphragm segments 15 are arranged between the two diaphragm cages 107 and 108. Again, for the sake of a better understanding of the drawing the latter illustrates only one of the plurality of diaphragm segments 15 actually employed in the diaphragm. The FIGS. 4 and 5 illustrate portions of the FIG. 3 in an enlarged scale and particularly illustrate that the diaphragm segment 15 (FIG. 5) is provided on opposite sides with a bearing pin 16 and a guide pin 17, of which the pin 16 enters a corresponding bore provided in the diaphragm cage 107 so that this pin 16 constitutes the axis of rotation of the diaphragm segment 15. The pin 17, however, projects into a slot 18 provided in the diaphragm cage 108 and this slot 18 terminates at its outermost end into a slot portion 118 which extends concentrically about the optical axis of the camera objective. A displacement of the pin 17 in the concentric slot 118 takes place when a certain guide number has been selected which is followed by a rotative movement of the diaphragm cage 107 and serves the sole purpose to store the selected guide number in the diaphragm mechanism without, at least for the present, changing the diaphragm aperture.

It has already been stated that the diaphragm cage 107 upon rotation of the ring 19 within its flash exposure range, i.e. when guide numbers smaller than 176 are selected, is rotated in clockwise direction by the projection 69 which engages the radial arm 10 and that, when the ring 19 is rotated reversely, the diaphragm cage 107 under the action of the spring 8 follows the projection 69. It also has been pointed out before that when the diaphragm cage 108 is released upon a release of the camera shutter, the diaphragm cage 108 is sooner or latter arrested in its movement by the catch member 75 which is controlled in dependence of the adjusted distance.

In order to explain in more detail in what manner the adjusted guide number by means of the parts 69, 10 and the adjusted distance by means of the parts 75, 5 is introduced into the diaphragm aperture according to the previously mentioned equation, and in what manner these two factors form the diaphragm aperture in the employed diaphragm mechanism equipped with two rotatable diaphragm cages, the FIG. 4 has been provided with the following auxiliary symbols and scales: At the lower edge of the diaphragm segment 15 is shown a row of small circles 82 which indicates the position which the pin 16 and therewith the segment 15 will assume when the diaphragm cage 107 is rotatably adjusted in selecting a guide number. For the purpose of making clear the corresponding position of the pin 16 and the guide number, a guide number scale 79 has been applied to the mentioned row of small circles. The slot 18 also is provided with a row of small circles 81 and next to these circles is shown a diaphragm scale 78 which indicates the positions of the pin 17 when the relative position between the diaphragm cages is changed by a rotation of the diaphragm cage 108 which results in corresponding changes of the diaphragm aperture. The concentric slot 118 is provided with a row of small circles 83 therein and next thereto is a guide number scale 80 so as to make clear the positions of the pin 17 when the diaphragm cage 107 is rotated upon a change of the guide number.

In connection with the series of abutment steps 5 of the diaphragm cage 108, there are shown a number of concentric dashed lines 84 which indicate the individual positions of the end 75 of the lever 73 in dependence of the distance adjustment. The individual guide lines 84 have associated therewith corresponding distance values in the form of a row of numbers 85. Finally, there are shown in FIG. 3 a number of spaced radial lines 86 which indicate the division into individual intervals of the total return movement of the diaphragm cage 108 with respect to the lever 75 and serve to demonstrate the formation of the diaphragm aperture with respect to the distance adjustment and the guide number value.

FIG. 4 designates with 176 the positions of the front pin 17 and of the rear pin 16 in a front view of the camera and the camera objective, respectively, in one of the two extreme conditions, i.e. when the guide number 176 has been selected and the distance has been adjusted to 8 m. A distance smaller than 8 m. is not adjustable because, as shown in FIG. 3, the end 71 of the two-armed lever 70 have engaged the 8 m. step of the distance limiting ratchet cam 129 and therewith has blocked the distance adjusting ring 1 against movement. When the camera is released, the diaphragm cage 108 moves about seven diaphragm intervals down to the end 75 of the lever 73, as illustrated by the interval lines 86 (FIG. 3) and thereby effects the diaphragm apertures $f{:}22$ which is required for flash exposures when the camera has been adjusted to a guide number 176 and a distance of 8 m. The pin 16 has retained its position, since the diaphragm cage 107 also remained in its position. The pin 17, however, due to the return movement of the diaphragm cage 108, has moved into the position designated with 22 in the row of numbers 81.

Assuming that by retaining the distance adjustment of 8 m. one selects now the other extreme guide number 16. By a rotative adjustment of the ring 19 and the ensuing engagement of the radial arm 10 by the projection 69 the diaphragm cage 107 moves into the position indicated in dashed lines in FIG. 4. The pin 16, following suit, moves into the position designated with 16 in the row of circles 82 and simultaneously the diaphragm segment 15 moves into the position 15a indicated by dashed lines. Owing to the arrested position of the diaphragm cage 108 in the tensioned condition of the camera, the pin 17 in the slot 118 moves into the position designated with 16 in the row of circles 83. The lever 73 has retained its 8 m. position. When now the camera is released, the diaphragm cage 108 returns about seven diaphragm intervals until the first step of the series of abutment steps 5 comes into engagement with the end 75 of the lever 73. Due to the prior movement of the diaphragm cage 107 also about seven guide number intervals, the pin 17 passes in its return movement over seven intervals of the row of circles 83, namely along the entire concentric slot 118, and at the time of the engagement of the lever 73 with the first step of the series of abutment steps 5 is positioned at that point of the circular disc which is located at the border to the slot 118 and before the entrance into the slot 18. This position is characterized by the diaphragm aperture $f{:}2$ and in connection with the preceding explanations it will be appreciated that the diaphragm has remained fully open. This example illustrates also that the position of the two rotative diaphragm cages 107 and 108 and therewith the same engagement position between the steps 5 and the member 75 does not always result in the same diaphragm aperture. The 8 m. abutment position between the end 75 of the lever 73 and the next adjacent step of the series of abutment steps 5 which is the deepest and closet may result in any diaphragm aperture depending upon which guide number has been preselected.

A last example will explain when the guide number 16 has been selected and the other extreme distance is 1 meter. The adjustment to the guide number 16 by the ring 19 is followed, as disclosed in the preceding example, by a movement of the diaphragm segment 15 into the position 15a in which the pin 16 has reached the position 16 in the row of circles 82 and the pin 17 has reached the position 16 in the row of circles 83 which means that the diaphragm cage 107 has performed a movement over seven intervals. The end 75 of the lever 73 is being moved by the control cam 30 on the distance adjusting ring 1 into a position where an engagement with only the last one of the steps 5 (FIG. 4) can take place which means an additional difference of six intervals in the return movement of the diaphragm cage 108 with respect to the 8 m. position of the end 75 of the lever 73. If now the camera is released and the diaphragm cage 108 consequently performs its return movement, then it will move over thirteen intervals before the last step of the steps 5 comes into engagement with the end 75 of the lever 73 which assumes now a small angle of incidence with respect to the series of steps 5. This means that the pin 17 returns the same number of intervals, namely seven, within the concentric slot 118 and six intervals within the control slot 18. At the time of the engagement of the end 75 of the lever 73 with one of the steps 5 the pin 17 has reached the position 16 of the row of circles 81 which corresponds to the required diaphragm aperture $f{:}16$.

When the camera is changed from the flash exposure range to the automatic exposure range, i.e. when the mark "A" on the ring 19 designated with 49 is brought into registration with the stationary mark 21, the end 97 of lever 55 slides into the recess 57 in the ring 19 and this recess 57 is so shaped that the lever 55 is able to follow freely all movements required of it by the automatic exposure mechanism now in operation. This means that the lever 55 may assume all angles of incidence with respect to the steps 5 which are caused by rotative movements of the shaft 56 carrying the lever 55, which angles of incidence are instrumental in forming the proper diaphragm aperture when the diaphragm cage 108 performs its return movement and in accordance with the brightness conditions of the object to be photographed will sooner or later engage the steps 5 and therewith determine the correct diaphragm aperture.

In this changed condition of the camera the lever 73, 75 controlled by the cam 30 on the distance adjusting ring 1 need not be disconnected by any cam on the ring 19, since it is circumferentially displaced with respect to the lever 55 in such a manner that it is inoperative when the automatic exposure mechanism is used. The range of movement of the diaphragm cage 108 during the use of the automatic exposure mechanism amounts to not more than seven diaphragm intervals in clockwise direction. Consequently, when the lever 73, 75 is in the infinite position and the diaphragm opens to the aperture of $f{:}22$, the levers 73 and 96 at most might engage the steps 5 at the same time, whereby the lever end 96 engages the last step and the lever end 75 engages the first step of the series of steps 5. This, however, does not disturb the intended formation of the diaphragm aperture.

It is to be noted that the diaphragm cage 107 is stationary when the automatic exposure mechanism is used and also in the position where a manual diaphragm adjustment or preselection, respectively, is employed, as will appear hereinafter. In these ranges no guide numbers have to be stored any more so that the element instrumental in this function, namely the projection 69 on the ring 19, has been moved away from the radial arm 10 of the diaphragm cage 107 when the camera has been changed from flash exposure operation to the automatic exposure operation or to the manual diaphragm adjustment. The formation of the diaphragm aperture in these last named ranges results only from the movement of the diaphragm cage 108 in accordance with the distance and/or the angle of incidence of the lever 55 or the preselection abutment 224 cooperating with the steps 5.

For the disconnection of the distance limitation serves the highest point 66 of the cam 38 on the ring 19, which cam cooperates with the end 71 of the lever 70. This highest point lifts the lever end 71 and therewith the catch member 171 for the ratchet cam 129 above the highest cam level and keeps it there after it has passed the highest point 66 of the cam 38. Thus, the distance in the range of the automatic exposure mechanism and in the range of the manual diaphragm adjustment is freely selectable. The radial arm 10 cannot be influenced by the radial edge 77 on the ring 19, since this edge 77 is situated in a different plane. The cooperation between change and control elements of the various rings, cams, levers and the like in the different modifications of the invention, which elements are positioned in different planes, is brought about in that upwardly bent flaps, reinforced walls, projecting pins, etc. are provided, as will be observed from the perspective view of the camera and its parts as shown in FIG. 8.

If the ring 19 is further rotated in counterclockwise direction so that one of the values of the diaphragm scale 22 is opposite the index 21, the pre-selection projection 224 with its abutting edge 224a assumes the positions marked with diaphragm values. The engagement now takes place with the radial front surface 108a of the diaphragm cage 108. When the camera is released, the diaphragm cage 108 will perform its return movement which is shorter or longer according to the adjusted diaphragm aperture and the therefrom resulting position of the projection 224 or its edge 224a, respectively, and the diaphragm aperture set at the scale 22 is formed immediately before the exposure.

Figure 6:
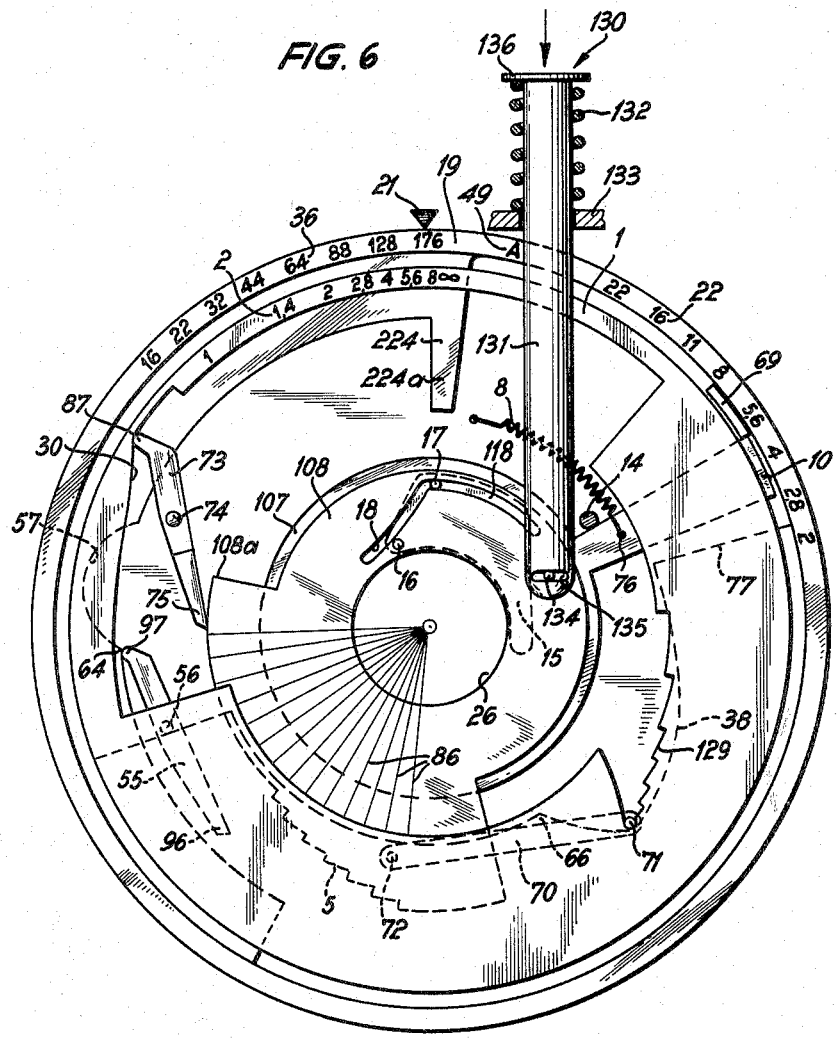
FIG. 6 illustrates still another embodiment of the invention in a view similar to FIG. 1.

The modification of the camera as shown in FIG. 6 is different from that of FIG. 3 in that the spring actuated diaphragm mechanism is replaced by a pressure diaphragm mechanism. The operating and arresting member 7 for the rotatable diaphragm cage 108 and the spring 8 located between the two rotatable diaphragm cages 107 and 108 have been dispensed with. Added is a push button 130 for the operation of the diaphragm. The shaft 131 of this push button extends vertically and is supported in a bearing 133 on the camera. The push button 130 may be pushed inwardly against the action of a spring 132 placed between a disc portion 136 of the push button and the upper face of the bearing 133. The shaft 131 is connected with the diaphragm cage 108 by way of the pin-slot connection 134, 135.

The operation of the embodiment of FIG. 6 in respect to the introduction of the distance and guide number values into the diaphragm mechanism or into the lever mechanism 73, 74, 75, respectively, is analogous to that of FIG. 3. Only the automatic return movement of the diaphragm cage when the camera is released is replaced by the manual return rotation by means of the push button connection 130–135 until the lever end 75 and the steps 5 come into engagement so that under like distance and guide number conditions the same diaphragm aperture will be formed as in the modifications explained before. Also the automatic or manual formation of the diaphragm aperture after the adjustment of the ring 19 to the desired operating range has principally not changed.

Figure 7:
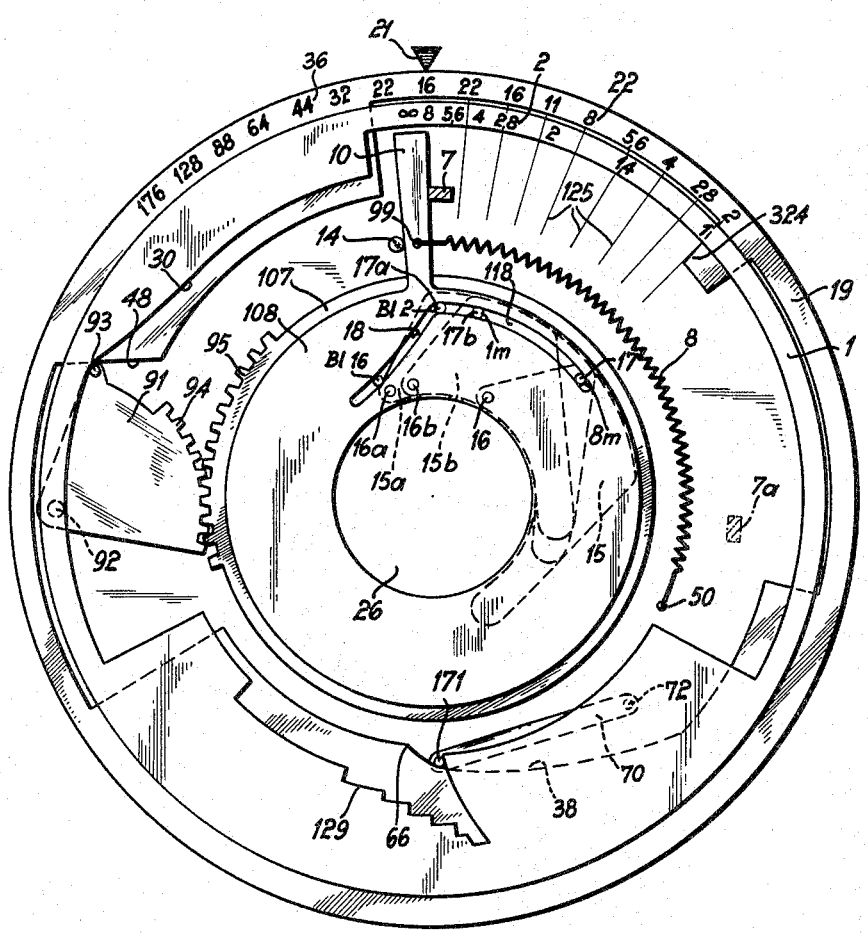
FIG. 7 illustrates a further embodiment of the invention in a view similar to FIG. 1.

The modification of FIG. 7 is particularly intended for cameras or camera objectives which are not provided with an automatic exposure mechanism. This modification is merely provided with a range for the flash operation and with a range for the manual diaphragm adjustment or diaphragm pre-selection, respectively. Therefore, the ring 19 carries merely a guide number scale 36 and a diaphragm scale 22 which are registrable to the stationary index 21. The distance value is introduced by a gear segment 91 rotatable about a stationary axis 92. The segment 91 is provided with gear teeth 94 meshing with gear teeth 95 provided on the diaphragm cage 107. The tracking pin 93 on the gear segment 91 is urged by a not illustrated spring against the cam 30 on the distance adjusting ring. The cam 30 is of such a shape that the segment 91 is rotated clockwise when the distance adjusting ring 1 is rotated counterclockwise toward smaller values. Accordingly, the diaphragm cage 107 rotates in counterclockwise direction.

In order to take into account the adjusted guide numbers with respect to the second rotatable diaphragm cage 108 for the purpose of forming the correct diaphragm aperture, the diaphragm cage 108 is provided with a radial arm 10 which cooperates with an abutment projection 324 arranged on the inner circumference of the ring 19. To this end the diaphragm cage 108 has been pretensioned by a spring 8 which on one hand is secured to the point 99 of the arm 10 and on the other hand is secured to the stationary point 50. In the tensioned condition of the camera the diaphragm cage 108 is blocked against a rotative movement in clockwise direction by the operating member 7 which is actuated by the shutter winding mechanism. When the shutter is released, the member 7 jumps into the position 7a indicated in dashed lines and the diaphragm cage 108 thereby is released for its return movement until the arm 10 engages the projection 324.

While in the embodiments shown in the FIGS. 3, 4 and 6 the stationary pin 14 is provided for the purpose of forming a stop for the radial arm 10 which is arranged on the diaphragm cage 107 and from the illustrated initial position is prevented from rotating counterclockwise, FIG. 7 shows another embodiment in which the radial arm 10 is arranged on the diaphragm ring 108 and therefore the pin 14 limits the rotative movement of the diaphragm ring 108 in counterclockwise direction.

Of all the employed diaphragm segments only one segment 15 is illustrated which is provided, as shown in FIG. 5, on one side with a pin 16 which engages a bore in the diaphragm cage 107 and on the other side with a pin 17 which extends into the control slot 18 and may travel in the concentric slot 118 of the cage 108. The slot 118 serves for the purpose of storing the distance values resulting from the rotation of the diaphragm cage 107, which distance values cause changes in the position of the pin 17 within the slot 118. For a better understanding of the drawing the various positions of the pin 17 in accordance with the adjusted distance values are illustrated by a row of circles which are designated with the corresponding distance values. This means more specifically that a rotation of the diaphragm cage 107 in accordance with an adjustment to smaller distance values is followed by a displacement of the diaphragm segment 15 about the light passage aperture 26, whereby the control pin 17 is able to move within the slot 118 up to the position 17a without causing a closure of the diaphragm. The segment 15 may even move beyond this point, as will be explained in detail farther down, without any change in the fully open diaphragm aperture. The pin 17 may move into the position located at the end of the slot 118 which is designated with B/2 and constitutes the highest point of the control slot 18. Only when the pin 17 enters the control slot 18 itself, the diaphragm is going to be closed gradually. This is the case when a higher guide number has been adjusted or when a diaphragm aperture smaller than f:2 has been selected.

As a first example the formation of the diaphragm aperture in the flash exposure range is to be explained, which example is the one in which the guide number 16 has been selected and the distance has been adjusted to 8 m. When the camera is tensioned, the diaphragm segment 15 is in the position illustrated and in which the pin 17 is at the end of the slot 118 at the point indicated with 8 m. When the camera is released, the spring 8 becomes effective so that the diaphragm cage 108 moves in clockwise direction. The diaphragm cage 108 traverses eight diaphragm intervals before its arm 10 comes into an engagement with the projection 324, as is illustrated by the radial interval lines 125. The pin 17, therefore, has moved back within the slot 118 the same number of intervals and has reached the position designated with B/2 (f:2) and located at the merger point of the slot 118 with the control slot 18. This means that with the adjustment of the guide number 16 and a distance of 8 m. the required diaphragm aperture f:2 has been formed automatically.

As another example may be that of the adjustment of the guide number 16 and a distance of 1 m. After the ring 19 again has been rotatably adjusted, the gear segment 91 rotates the diaphragm cage 107 about six intervals so that the diaphragm segment 15 moves into the position 15b in which the pin 16 occupies the position 16b. The control pin 17 has moved back about six intervals within the concentric slot 118 of the arrested diaphragm cage 108 and has reached the position designated with 17b or 1 m. Upon subsequent release of the camera, the diaphragm cage 108—because the guide number has remained adjusted to the value 16—returns eight intervals so that consequently the control pin 17 is caused to move back also eight intervals in the slot 118 and finally reaches the position designated with B/16 in the control slot 18 which means that the diaphragm has been closed down to its second smallest aperture.

Since in the foregoing the adjustments have been basically disclosed on hand of two examples, further possible adjustments of the camera or the camera objective, respectively, may be readily derived therefrom. The principle of the invention, as may be recapitulated, consists in this that with a progressively decreasing distance adjustment the control pin 17 steadily moves closer to the control slot 18 and engages the same at a point located the deeper, the higher the guide number has been adjusted, which action results in the formation of the correct diaphragm aperture. The abutment 324 moves away from the control arm 10 the more and the return movement of the diaphragm cage 108 becomes the greater, the higher the guide number has been selected.

When the camera is changed from the range of the flash exposure to the range of manual diaphragm preselection, the diaphragm cage 107 is arrested in an inoperative opsition by the action of the tracking pin 93 on the gear segment 91 which is controlled by the disconnecting cam 48 on the ring 19. The segment 91 is rotated by the disconnecting cam 48 such a distance in clockwise direction that the diaphragm cage 107 upon corresponding rotation in counterclockwise direction moves the diaphragm segment 15 into the position 15a in which the pin 16 assumes the position 16a and the control pin 17 assumes the position 17a (f:2). The diaphragm cage 107 which is now arrested in this position is ineffective for the further formation of the diaphragm aperture. The diaphragm aperture henceforth is formed merely by the diaphragm cage 108 whose rearward movement is determined by the position of the projection 324. The starting point of the control pin 17 is no longer a point within the concentric portion 118, but is the point 17a within the control slot 18. The diaphragm mechanism therewith has become a conventionally operating spring actuated diaphragm mechanism.

FIG. 8 illustrates in a perspective front elevation view a camera employing the specific arrangement of FIG. 3. Like elements in both figures are designated with like reference numerals. In additional, FIG. 8 shows that the camera casing 58 is provided with a photoelectric cell 61, a measuring instrument 62 for the exposure meter, a tracking member 63 and a gear connection formed by two bevel gears 65 which operate the shaft 56 carrying the lever 55. The specific means for the deflection of the tracking member 63, for instance a noncircular disc rotated by the measuring instrument and the clamping device for the pointer of the instrument, which would be necessary in this connection, are not shown since they do not form part of the present invention. For the understanding of the exposure mechanism whose combination with the flash exposure mechanism is the instant problem, it is sufficient to point out that the shaft 56 of the lever 55 is controlled directly by the measuring instrument of the exposure meter and performs rotative movements by which one end 96 of the lever 55 is moved toward or away from the series of steps 5 so that in dependence of the light value measured a longer or shorter return movement of the corresponding diaphragm control ring and the time control ring connected therewith (not shown) is made possible, whereby the diaphragm is closed more or less and the exposure time is adjusted accordingly.

The other end 97 of the lever 55 engages the cam 64 on the inner circumference of the ring 19 for changing the camera selectively to one of its operating ranges, such as manual diaphragm adjustment, automatic exposure mechanism or flash exposure operation. This cam 64 on the inner circumference of the ring 19 which cooperates with the lever end 97 constitutes a disconnecting cam for the lever 55 and therewith also for the automatic exposure mechanism. As shown in FIG. 8, the stationary index 21 indicates the adjustment of the camera to the flash exposure mechanism. By the engagement of the lever end 97 of the lever 55 with the cam 64 the lever 55 is removed from the range of the series of steps 5 on the cage 108. However, as soon as the camera has been adjusted to the range of the automatic exposure mechanism by bringing the mark "A" designated with 49 into registration with the index 21, the lever 55 by moving its end 97 into the recess 57 of the actuating ring 19 is released and under simultaneous disconnection of the flash exposure mechanism the camera is changed to the range of the automatic exposure mechanism.

What I claim is:

1. A photographic camera designed for selectively making flash exposures and daylight exposures, said camera comprising in combination:
   (a) a photographic objective provided with an adjustable diaphragm mechanism,
   (b) an automatic diaphragm adjusting means,
   (c) a manual diaphragm adjusting means,
   (d) a flash guide number adjusting means,
   (e) a distance adjusting means,
   (f) means for coupling said distance adjusting means with said means for adjusting said guide number adjusting means for automatically adjusting said diaphragm to an aperture which produces a predetermined exposure by said photographic objective,
   (g) said diaphragm mechanism being provided with two rotatable diaphragm cages and diaphragm segments adjustable by said cages, each one of said cages being adapted to adjust said diaphragm segments independently, and
   (h) means for operatively connecting said diaphragm cages selectively with said flash guide number adjusting means, said automatic diaphragm adjusting means, said manual diaphragm adjusting means and said distance adjusting means in such a manner that the position of the first diaphragm cage is determined by the adjusted guide number and the position of the second diaphragm cage is determined by the adjusted distance.

2. A photographic camera according to claim 1, in which said distance adjusting means and said flash guide number adjusting means are formed by rotatably adjustable rings, said rings being concentrically arranged about the optical axis of said objective and being provided with distance and guide number scales, respectively, and a common stationary index for these scales, said rings being provided on their inner circumference with means for transferring the adjusted distance and guide number values to said diaphragm cages by rotatably adjusting the latter.

3. A photographic camera according to claim 1, in which said distance adjusting means and said flash guide number adjusting means are formed by rotatably adjustable rings, said rings being concentrically arranged about the optical axis of said objective and being provided with distance and guide number scales respectively, and a common stationary index for these scales, said rings being provided on their inner circumference with means for transferring the adjusted distance and guide number values to said diaphragm cages by rotatably adjusting the latter, whereby said ring employed for adjusting the distance is provided on its inner circumference with a control cam, and including an intermediate element arranged between said control cam on said distance adjusting ring and one of said diaphragm cages, said intermediate element being deflected by said control cam and transferring its changes in position to said diaphragm cage for rotatably adjusting the same.

4. A photographic camera according to claim 1, in which said distance adjusting means and said flash guide number adjusting means are formed by rotatably adjustable rings, said rings being concentrically arranged about the optical axis of said objective and being provided with distance and guide number scales respectively, and a common stationary index for these scales, said rings being provided on their inner circumference with means for transferring the adjusted distance and guide number values to said diaphragm cages by rotatably adjusting the latter, whereby said ring employed for adjusting the distance is provided on its inner circumference with a control cam, and including an intermediate element arranged between said control cam on said distance adjusting ring and one of said diaphragm cages, said intermediate element being deflected by said control cam and transferring its changes in position to said diaphragm cage for rotatably adjusting the same, said control cam being of such a shape that the nonuniform intervals between the distance values of the distance scale bring about a rotative adjustment of the diaphragm cage which effects a change of the diaphragm aperture about one diaphragm interval.

5. A photographic camera according to claim 1, in which said distance adjusting means and said flash guide number adjusting means are formed by rotatably adjustable rings, said rings being concentrically arranged about the optical axis of the said objective and being provided with distance and guide number scales respectively, and a common stationary index for these scales, said rings being provided on their inner circumference with means for transferring the adjusted distance and guide number values to said diaphragm cages by rotatably adjusting the latter, whereby the ring employed for adjusting said camera objective to the desired guide number is provided on its inner circumference with a projection which cooperates with an arm extending outwardly from one of said diaphragm cages.

6. A photographic camera according to claim 1, in which said distance adjusting means and said flash guide number adjusting means are formed by rotatably adjustable rings, said rings being concentrically arranged about the optical axis of said objective and being provided with distance and guide number scales respectively, and a common stationary index for these scales, said rings being provided on their inner circumference with means for transferring the adjusted distance and guide number values to said diaphragm cages by rotatably adjusting the latter, whereby said ring employed for adjusting the distance is provided on its inner circumference with a control cam, and including an intermediate element arranged between said control cam on said distance adjusting ring and one of said diaphragm cages, said intermediate element being deflected by said control cam and transferring its changes in position to said diaphragm cage for rotatably adjusting the same, said other ring employed for adjusting the camera objective to the desired guide number being provided on its inner circumference with a projection which cooperates with an arm extending outwardly from said other diaphragm cage.

7. A photographic camera according to claim 1, in which said distance adjusting means and said flash guide number adjusting means are formed by rotatably adjustable rings, said rings being concentrically arranged about the optical axis of said objective and being provided with distance and guide number scales, respectively, and a common stationary index for these scales, said rings being provided on their inner circumference with means for transferring the adjusted distance and guide number values to said diaphragm cages by rotatably adjusting the latter, whereby said ring employed for adjusting the distance is provided on its inner circumference with a control arm, and including an intermediate element arranged between said control cam on said distance adjusting ring and one of said diaphragm cages, said intermediate element being deflected by said control cam and transferring its changes in position to said diaphragm cage for rotatably adjusting the same, said intermediate element comprising an angle lever, a stationary axis on which said angle lever is pivotally mounted, means for maintaining one end of said lever in engagement with said control cam, gear teeth on the other end of said lever, and gear teeth on said one diaphragm cage meshing with said gear teeth on said angle lever.

8. A photographic camera according to claim 1, in which said distance adjusting means and said flash guide number adjusting means are formed by rotatably adjustable rings, said rings being concentrically arranged about the optical axis of said objective and being provided with distance and guide number scales respectively, and a common stationary index for these scales, said rings being provided on their inner circumference with means for transferring the adjusted distance and guide number values to said diaphragm cages by rotatably adjusting the latter, whereby said ring employed for adjusting the distance is provided on its inner circumference with a control cam, an intermediate element arranged between said control cam on said distance adjusting ring and one of said diaphragm cages, said intermediate element being deflected by said control cam and transferring its changes in position to said diaphragm cage for rotatably adjusting the same, said other ring employed for adjusting the camera objective to the desired guide number being provided on its inner circumference with a projection which cooperates with an arm extending outwardly from said other diaphragm cage, and a circular spring concentrically surrounding said other diaphragm cage and having outwardly extending ends which engage opposite sides of said arm on said other diaphragm cage, said ends of said spring in the initial position of said one diaphragm cage engaging also a stationary pin.

9. A photographic camera, comprising the combination of means according to claim 1, and including means having the form of intermediate elements which store the adjusted guide number values and distance values and leave the diaphragm aperture unchanged, means for releasing the tensioned camera, and means for causing said intermediate elements to adjust said diaphragm aperture to the required size upon operating said camera release means.

10. A photographic camera, comprising the combination of means according to claim 1, and including means having the form of intermediate elements which store the adjusted guide number values and distance values and leave the diaphragm aperture unchanged, means for releasing the tensioned camera, and means for causing said intermediate elements to adjust said diaphragm aperture to the required size upon operating said camera release means, one of said intermediate elements comprises a lever which is pivotally mounted between its ends about a stationary axis and carries a tracking pin engaging a control cam on said distance adjusting means, while a catch member on said lever cooperates with a series of abutment steps on one of said two diaphragm cages (FIGS. 3 and 8).

11. A photographic camera, comprising the combination of means according to claim 1, and including means having the form of intermediate elements which store the adjusted guide number values and distance values and leave the diaphragm aperture unchanged, means for releasing the tensioned camera, and means for causing said intermediate elements to adjust said diaphragm aperture to the required size upon operating said camera release means, one of said intermediate elements comprises a lever which is pivotally mounted between its ends about a stationary axis and carries a tracking pin engaging a control cam on said distance adjusting means while a catch member on said lever cooperates with a series of abutment steps on one of said two diaphragm cages (FIGS. 3 and 8), another one of said intermediate elements comprises an outwardly extending arm on the other one of said diaphragm cages which cooperates with a control projection on said flash guide number adjusting means.

12. A photographic camera, comprising the combination of means according to claim 1, and including means having the form of intermediate elements which store the adjusted guide number values and distance values and leave the diaphragm aperture unchanged, means for releasing the tensioned camera, and means for causing said intermediate elements to adjust said diaphragm aperture to the required size upon operating said camera release means, one of said intermediate elements comprises a lever which is pivotally mounted between its ends about a stationary axis and carries a tracking pin engaging a control cam on said distance adjusting means, while a catch member on said lever cooperates with a series of abutment steps on one of said two diaphragm cages (FIGS. 3 and 8), another one of said intermediate elements comprises an outwardly extending arm on the other one of said diaphragm cages which cooperates with a control projection on said flash guide number adjusting means, a spring connecting said two rotatable diaphragm cages for relative rotation thereof, and a stop member for limiting the rotative movements of said cages caused by said spring (FIGS. 3 and 8).

13. A photographic camera according to claim 1, in which each diaphragm segment is provided on each of its sides with an outwardly extending pin of which one pin is rotatably supported in a bore provided in one of said diaphragm cages while the other pin extends into a control slot provided in said other diaphragm cage, said control slot merging into a concentric slot in said other diaphragm cage, whereby upon an adjustment of the guide number the diaphragm segments perform solely a rotative movement about the pin mounted in said bore, while said other pin moves along said concentric slot, thereby leaving the light passage aperture of said photographic objective unchanged (FIGS. 3 and 8).

14. A photographic camera according to claim 1, in which said distance adjusting means and said flash guide number adjusting means are formed by rotatably adjustable rings, said rings being concentrically arranged about the optical axis of said objective and being provided with distance and guide number scales respectively, and a common stationary index for these scales, said rings being provided on their inner circumference with means for transferring the adjusted distance and guide number values to said diaphragm cages by rotatably adjusting the latter, whereby the ring employed for adjusting said camera objective to the desired guide number is provided on its inner circumference with a projection which cooperates with an arm extending outwardly from one of said diaphragm cages, and a second projection on said guide number adjusting ring adapted to engage said arm on one of said diaphragm cages when said camera is adjusted for manual adjustment of the diaphragm aperture.

15. A photographic camera according to claim 1, in which a diaphragm aperture preselecting abutment (224 in FIG. 3) is provided on said flash guide number adjusting means which upon adjustment to manual diaphragm selection cooperates with an abutment face on one of said diaphragm cages, said abutment at the same time limiting the rotative movement of said diaphragm cage within the range of manually adjustable exposures.

16. A photographic camera according to claim 1, including additional means which in dependence of the adjusted guide number automatically limit the distance range to which the camera objective is adjustable.

17. A photographic camera according to claim 1, including additional means which in dependence of the adjusted guide number automatically limit the distance range to which the camera objective is adjustable, said additional means for automatically limiting the distance range include a control cam on said flash guide number, a ratchet cam on said distance adjusting means, and a pivotally mounted lever whose pivotal movement is controlled by said control arm and a portion of which is adapted to be engaged by a step on said ratchet cam when said distance adjusting means is operated.

18. A photographic camera according to claim 1, including means for pressure operating said adjustable diaphragm mechanism.

19. A photographic camera according to claim 1, including means for pressure operating said adjustable diaphragm mechanism, said means including a pressure operated shaft provided at one end with a pressure key while the other end of said shaft is operatively connected with one of said rotatable diaphragm cages, and a spring for holding said shaft in its initial position.

References Cited by the Examiner
UNITED STATES PATENTS

| | | | |
|---|---|---|---|
| 2,464,559 | 3/49 | Davenport | 95—64 |
| 2,953,978 | 9/60 | Rentschler | 95—10 |
| 2,965,011 | 12/60 | Rentschler | 95—64 |
| 2,974,576 | 3/61 | Hahn | 95—64 |
| 2,993,422 | 7/61 | Rentschler | 95—10 |
| 3,067,663 | 12/62 | Kremp | 95—64 |
| 3,071,056 | 1/63 | Gebele | 95—64 |

NORTON ANSHER, *Primary Examiner.*

D. B. LOWE, *Examiner.*